3,006,773
FRUIT PRODUCT AND METHOD OF
PRODUCING SAME
Gerald A. Fitzgerald, 128 River Drive, Hadley, Mass.,
assignor of one-third to Raymond R. Colton and one-
third to Sidney W. Dean, Jr., New York, N.Y.
No Drawing. Filed June 30, 1959, Ser. No. 823,857
7 Claims. (Cl. 99—134)

This invention relates to food products, and particularly to a fruit product and method of producing same.

The healthful qualities of fruit as an article of diet are well recognized. It also is a matter of common knowledge that the majority of persons enjoy the flavor of natural fruits, and many prefer same over confections such as cakes and candies. At the same time, this well-founded preference is not fully reflected in the proportionate consumption of fruit, especially as a between-meal snack, in comparison to that of concentrated sugar confections and other commodities of less highly regarded dietary value.

One reason for this relatively small consumption of fruit, stems from the forms in which it is available. Whereas candy, chewing gum, and other articles of casual consumption, are commonly available in convenient form in handy packages, fruit is not prepared with a view to the convenience of the consumer. Fresh fruit is most difficult to handle in view of the necessity to remove and dispose of the seeds, peel, and stems, and furthermore has a propensity to soil and stain clothing, hands and articles of furniture. On the other hand, dried fruit, while more convenient, is not, as ordinarily prepared, as suitable to keep within reach or as free from the aforesaid drawbacks, as the more versatile offerings.

This invention is directed to the preparation of fruit, especially dried fruit, in a convenient and attractive form, and in a manner that will preserve the original natural flavor. It is also a purpose of the invention to dispense with the need for the consumer to handle the inedible portions, and package only the selected edible parts of the fruit. This invention is also directed to the provision of a fruit preparation that can be kept on hand for considerable periods of time without deterioration or loss of flavor.

Whereas the term "fruit" is employed in this description in the common usage thereof, i.e., as signifying commodities such as apricots, prunes, raisins, peaches, pears, oranges, dates, apples, cherries, and the like, the employment of a certain portion of "vegetable" is not necessarily excluded. As commonly understood, the line between "fruits" and "vegetables" is not hard and fast, and it is contemplated to employ the advantages of the invention with respect to any and all edible products of the vegetable kingdom amenable to the described processing treatment, not excluding in some cases the incorporation of very moderate additions of flavor-enhancing herbs, vegetable extracts, and the like.

It is an object of the invention to provide a fruit preparation in the form of a stick or bar.

It is a further object of the invention to provide fruit in a convenient packaged form with special reference to the needs of marketing and consumption, and in a form that can be displayed in individually wrapped packages.

It is a further object of the invention to make available a food product having beneficial food properties.

It is a further object of the invention to retain the natural unaltered original flavor of the fruit.

It is a further object of the present invention to provide a fruit product that will remain stable and both physically and chemically unchanged during long periods of storage without benefit of refrigeration.

It is a further object of the present invention to provide a fruit product that will have good nutritional value.

It is a further object of the invention to provide an improved process for incorporating sugar in certain quantities into a fruit product.

Essentially, the fruit preparation according to the present invention consists of the natural fruit pulp in the uncooked condition with the inedible parts of the fruit removed, the pulp being reduced by comminution to a uniform, finely divided condition thereby forming a mass having a consistency suitable for molding into the form of chunks, sticks, or bars, of convenient size which may be wrapped and distributed for eating, these portions being not substantially smaller than, for example, a stick of chewing gum or larger than an ordinary candy bar. To improve the qualities of the product it is found desirable to add a moderate amount of one or more sugars, such sugars being, for example, cane sugar, beet sugar, corn sugar, sorbitol, and beta/alpha-lactose and to assist in the intermixing there also may be added a small amount of water, the proportion of which will depend to a considerable extent on the degree of dryness of the fruit. It is to be understood that the consistency of the mass should be such as to facilitate the formation and retention of the same in molded form. Whereas mixed fruits may be processed by the method hereinafter described, it is preferred in the practice of the invention that the product be solely or mainly composed of a single fruit, and be thus characterized by a single fruit flavor.

Heretofore it has been common practice to preserve fruit by adding sugar, as in the preparation of preserved fruits, fruit sauces, jams, jellies and other products of more or less watered and sweetened form. It also has been known to coat fruit items with sugar in the form of a glaze or powder. In incorporating the sugar, it has been customary to further promote the admixture of these ingredients by heating the mixture to cooking temperatures. When cooking is resorted to, there results normally a somewhat sticky or syrupy product in which the original natural fruit flavor has been altered and in which the physical consistency of the material has been changed in such a way as to be unsuited to purposes of packaging in dry form that can be easily handled by the consumer. On the other hand, when cooking is not resorted to, difficulty is encountered in that the fruit and the sugar resist homogenization. The addition of water aids in the process to some extent but creates a gummy property that is objectionable for direct handling.

It has been found, proceeding in accordance with the present invention, that if a minor proportion of sugar is added to the fruit while controlling the moisture content, and comminution of the mixture is carried out at freezing temperatures, for example 0° to 25° F., the aforesaid disadvantages may be avoided, and a product may be obtained which has desirable characteristics of natural flavor, low sugar content, homogeneous blending, and comparatively dry, non-sticky handling qualities, and which further has a controllably firm texture well suited to facility in consumption.

Although by regulating the moisture content a favorable consistency with respect to chewability may be secured, there may at the same time be noticeable in the product a certain gumminess or stickiness which some may find objectionable. In this respect, it has been found that the incorporation of flaked or powdered bran from grains such as wheat and rice constitutes a valuable addition agent. Not only does the dispersion of this agent throughout the fruit solids improve the consistency of the product, but the pericarp (bran) of grain seeds is a valuable source of vitamin $B_1$ which with the vitamins A and B of the dehydrated fruits together provide a concentrated food product high in nutritional value.

The fruit forming the basis of the present process may advantageously be in normally partially dehydrated condition. Such fruit which may contain about 18 percent moisture is reduced to a suitable degree of subdivision as, for example, by means of cutting into fine shreds. With this dried and subdivided fruit there is incorporated a mixture composed essentially of minor proportions of sugar and water, these proportions being based on the amount of the fruit. The temperature of the resultant mixture is reduced below the freezing point of water. With a fruit of naturally high sugar content a lesser amount of sugar may be used, and the amount of water will depend on the degree of dryness of the fruit. The mixture of dried fruit, sugar and water, reduced to and maintained at a temperature below freezing, is subjected to a comminuting and homogenizing treatment, in a pre-cooled high-speed blending machine such as a hammer mill. This blending treatment may be completed in a matter of minutes. Thereafter the temperature of the blended product may be raised. In order to stabilize the moisture content, a humectant may be incorporated with the product, such as glycerin, propylene glycol, and crystalline D-sorbitol. Further, a fungicide such as potassium sorbate may be included. In some cases, the product may be subjected to a subsequent caramelization treatment. Thereafter, the product may be molded by pressure into suitable forms and shapes and packaged for distribution.

It has been further found that whereas certain sugars in the product, particularly sucrose, have a tendency over a period of time to take up water of crystallization from retained moisture and thereby give rise to the development of an undesirable grainy or granular texture in the product, and whereas either a humectant such as sorbitol, glycerol or propylene glycol, or of a sugar that is soluble under the low moisture conditions existing in the product, such as fructose, commercial glucose or beta lactose or a mixture of such sugars, will when incorporated in the product to a considerable degree act as a crystallization inhibitor, the combination of both a humectant and a non-crystalline sugar, overcomes crystal formation to a greater degree than would be expected from the results of using either separately.

In order that the invention and practice thereof may be clearly understood the following examples are given:

Example 1

Dried apricots, cooled to a temperature of 20–25° F., cut into shredded form, are admixed with beta lactose, sucrose and water, in the following proportions:

| | |
|---|---|
| Dried apricots | 28 parts by weight. |
| Beta lactose | 12 parts by weight. |
| Sucrose | 8 parts by weight. |
| Water | 10 parts by weight. |
| Potassium sorbate | 0.1 percent based on the total weight. |

The foregoing ingredients while cooled to 20–25° F. are placed in a pre-cooled hammer mill and comminuted and mixed for 3 minutes until the larger particles in the mixture will pass through a 50-mesh sieve. The product now is molded into sticks and wrapped separately in waxed paper.

Example 2

The foregoing procedure is carried out using the following components:

| | Parts by weight |
|---|---|
| Prunes | 25 |
| Crystalline D-sorbitol | 5 |
| Beet sugar | 10 |
| Water | 4 |

Example 3

Following the same procedure as 1, the product is subjected to a mild caramelization.

Example 4

| | Lbs. |
|---|---|
| Low temperature comminuted dry fruit | 25 |
| Rice or wheat bran, ground as desired | 5 |
| Sorbitol | ¼ |
| Commercial glucose | 2½ |
| Water to achieve desired consistency for molding final product into bars. | |

In practice, the ground bran flakes are mixed thoroughly with the comminuted dried fruit at low temperatures so as to thoroughly disperse the latter. The sorbitol and commercial glucose can be added separately or combined and can be worked into the dispersed mixture either in the cold or after removal of the mix to warmer ambient temperatures.

Having now particularly described and disclosed the nature of the herein invention and in what manner the same is to be performed, what is claimed is as follows:

1. A method of preparing a fruit product comprising comminuting and homogenizing a mixture comprising uncooked fruit and added sugar while maintaining the temperature of the mixture below the freezing point of water.

2. A method of preparing a fruit product comprising comminuting dried fruit, mixing therewith sugar and water, each in minor proportion with respect to said fruit, cooling said mixture to a temperature below the freezing temperature of water, and homogenizing and further comminuting said fruit with said sugar and water at said freezing temperature.

3. A method of preparing a fruit product comprising cooling dried fruit to a temperature below the freezing point of water, reducing said dried fruit to finely divided condition, admixing said dried fruit with minor proportions of water and sugar, and, while maintaining the mixture at said freezing temperature, comminuting and homogenizing said mixture.

4. A method of preparing a fruit product comprising cooling a portion of finely divided dried fruit having a moisture content of about 18 percent to a temperature of 0° to 25° F., admixing therewith a minor proportion of sugar cooled to a temperature of 0° to 25° F., homogenizing said mixture while maintaining the temperature thereof at 0° to 25° F., continuing said comminution and homogenization until the largest particle in said mixture will pass through a sieve of size 50 to 100 mesh, and molding said product into individual pieces.

5. A method of preparing a fruit product comprising cooling 28 parts by weight of shredded dried fruit to a temperature of 20–25° F., admixing therewith 12 parts by weight of beta lactose and 8 parts by weight of sucrose with 10 parts by weight of water, comminuting and homogenizing said mixture of sugar, water and fruit while maintaining the temperature thereof at 20–25° F., continuing said comminution and homogenization until the largest particle in said mixture will pass through a 50-mesh sieve, and molding said product into individual pieces.

6. A method of preparing a fruit product comprising admixing uncooked partially dehydrated fruit with minor amounts respectively of bran, glucose and water, reducing the temperature of said mixture to a point below the freezing point of water, and while maintaining said mixture at said temperature, subjecting said mixture to a comminuting and homogenizing operation.

7. A product produced by the process according to claim 1.

References Cited in the file of this patent

UNITED STATES PATENTS

| | | |
|---|---|---|
| 2,182,619 | Sharp et al. | Dec. 5, 1939 |
| 2,217,700 | Musher | Oct. 15, 1940 |
| 2,650,881 | Forkner | Sept. 1, 1953 |

OTHER REFERENCES

"Atlas Sorbitol," Atlas Powder Company, Wilmington 99, Delaware, 1947, pp. 9 and 11.